Sept. 25, 1962  T. M. HARRER ET AL  3,055,408

PEAR SEED CELLING MECHANISM

Filed Oct. 10, 1958  9 Sheets-Sheet 1

INVENTORS
THEODORE M. HARRER
MALCOLM W. LOVELAND
ROLAND F. BLAKEWELL

BY Mellin and Hanscom
ATTORNEYS

INVENTORS
THEODORE M. HARRER
MALCOLM W. LOVELAND
BY ROLAND F. BLAKEWELL

Mellin and Hanscom
ATTORNEYS

INVENTORS
THEODORE M. HARRER
MALCOLM W. LOVELAND
ROLAND F. BLAKEWELL

BY Mellin and Hanscom

ATTORNEYS

Sept. 25, 1962 T. M. HARRER ETAL 3,055,408

PEAR SEED CELLING MECHANISM

Filed Oct. 10, 1958 9 Sheets-Sheet 4

INVENTORS
THEODORE M. HARRER
MALCOLM W. LOVELAND
ROLAND F. BLAKEWELL

BY Mellin and Hanscom

ATTORNEYS

INVENTORS
THEODORE M. HARRER
MALCOLM W. LOVELAND
ROLAND F. BLAKEWELL
BY Mellin and Hanscom
ATTORNEYS Sept. 25, 1962 T. M. HARRER ETAL 3,055,408

PEAR SEED CELLING MECHANISM

Filed Oct. 10, 1958 9 Sheets-Sheet 6

INVENTORS
THEODORE M. HARRER
MALCOLM W. LOVELAND
ROLAND F. BLAKEWELL

BY Mellin and Hanscom

ATTORNEYS

PEAR SEED CELLING MECHANISM

Filed Oct. 10, 1958

9 Sheets-Sheet 7

INVENTORS
THEODORE M. HARRER
MALCOLM W. LOVELAND
ROLAND F. BLAKEWELL

BY Mellin and Hanscom

ATTORNEYS

INVENTORS
THEODORE M. HARRER
MALCOLM W. LOVELAND
ROLAND F. BLAKEWELL

BY Mellin and Hanscom
ATTORNEYS

INVENTORS
THEODORE M. HARRER
MALCOLM W. LOVELAND
BY ROLAND F. BLAKEWELL
Mellin and Hanscom
ATTORNEYS United States Patent Office 3,055,408
Patented Sept. 25, 1962

3,055,408
PEAR SEED CELLING MECHANISM

Theodore M. Harrer and Malcolm W. Loveland, Orinda, and Roland F. Blakewell, Oakland, Calif., assignors to Atlas-Pacific Engineering Company, Inc., Emeryville, Calif., a corporation of California
Filed Oct. 10, 1958, Ser. No. 766,579
10 Claims. (Cl. 146—52)

This invention relates to and in general has for its object the provision of a pear processing machine, and more particularly, to the provision of a machine for stem coring, seed-cell coring, peeling, stem end and blossom end coring, and optionally splitting a pear, of the general character disclosed in the Coons et al. application Serial No. 549,009, filed November 25, 1955, new Patent No. 3,018,179.

Processed pears are canned in halves, or diced and then canned as cocktail fruit. Recently, it has been determined that a greater yield of diced fruit can be obtained from a whole pear than from its two halves, this being purely a matter of the geometry of the fruit. In processing pears for cocktail purposes it is permissible to remove their seed-cell pods simply by cutting a cylindrical plug from the blossom end of the pear encompassing the seed-cell pod. However, when the end product desired is a half pear it is essential that when the seed-cell pod is removed, a wall or bridge of flesh be left between the trimmed calyx end of the pear half and its arcute seed-cell cavity of depression, for otherwise the halved pear has a tendency to split into quarters either during the processing operation or during the canning operation. The wall of flesh so left between the calyx end of the half pear and its seed-cell cavity simply serves to strengthen the half pear at this point and to hold it together during the remainder of the processing operation and the canning process, so that the final canned product will present a more pleasing appearance.

This all means that two different types of seed-cell pod corers are required for producing the two types of end products (half pears for canning directly, and whole pears for dicing prior to canning).

Generally, and depending upon the size of a pear, and more particularly its length, the seed-cell pod of a pear is located a predetermined distance from its blossom end. Prior to processing pears they are graded as to size, and the processing machine has to be set to handle a particular grade of pears, for it is not sufficiently flexible to handle all grades at any one setting. Presently, a changeover of the machine for handling a different grade of pear entails a considerable shut-down period. This is decidedly objectionable, for once pears have ripened they must be immediately processed and canned.

Recently, there has been available for canning an extraordinarily large pear in the order of five and one-half inches long, which must be processed as well as smaller pears of a length in the order of two inches.

Since the present invention constitutes an improvement over the machine disclosed in the Coons et al. application Serial No. 549,009, a brief description thereof should be of some help in better appreciating the objects of the present invention.

In general, the Coons et al. machine comprises a supporting frame including a vertical wall or partition disposed intermediate the front and rear ends of the machine. Journaled in this wall, and extending forwardly thereof, is a hollow spindle for receiving a pear coaxially therewith and which serves to support the pear during the entire processing operation, the spindle being provided with fins for keying the pear to the spindle for rotation therewith.

Mounted on the frame forwardly of the spindle and in alignment therewith is a pear orienting and feeding assembly arranged to intermittently impale pears on the spindle blossom end first, and coaxially therewith. Included in the feeding assembly is a fore and aft reciprocating bed, and releasably mounted thereon for fore and aft lost motion with the bed is a carriage. Supported by the carriage is a pear orienting and gripping assembly which per se impales the pear coaxially on the spindle.

Disposed between the carriage and the bed is a latching mechanism for detachably locking these two members together for limited concurrent movement towards the spindle. Mounted on the frame adjacent the fins of the spindle is a pear sensing element operating in response to the contact therewith of the calyx end of a pear impaled on the spindle. Associated with the sensing element and operating in response to the movement thereof is a trip member for unlatching said latching mechanism and arresting any further aft movement of the carriage, but permitting said bed to complete its aft cycle of movement independently of the carriage. As a result of this latching, sensing, and trip assembly, a pear can be precisely positioned on the spindle in correlation with its seed-cell pod, regardless of the actual size of the pear so long as the pear is within the grade for which the machine is designed or set, and regardless of the hardness or softness of the pear. Here it can be appreciated that because of variations in the hardness of a pear, and more particularly, to be able to precisely position a soft pear, the sensing, tripping, and latching mechanism must be extremely sensitive.

Mounted on the frame is a peeling assembling assembly, including a peeling head mounting a peeling knife arranged to traverse the pear from its calyx end to its stem end, and in so doing to follow the contour of the pear and cut a ribbon of skin therefrom.

Affixed to the spindle in the seed-cell pod zone of a pear impaled thereon are seed-cell coring or reaming fins of arcuate configuration, and secured to the spindle rearwardly of the coring fins and spaced therefrom is a set of calyx end trimming fins.

For coring cocktail whole pears only, the frame mounts a fore and aft reciprocating knife rearwardly of the calyx end trimming fins and is arranged to move into the calyx end of a pear and to cut a cylindrical plug therefrom embodying the seed-cell pod of the pear.

Mounted on the frame is a stem-end trimming assembly including a spring biased fore and aft translatable stem-end sensing arm, and carried by said arm rearwardly thereof is a stem-end trimming knife, means being provided for moving the knife crosswise of the pear after its stem end has been sensed or located so as to take a cut of predetermined size from the stem end of the pear.

Straddling the spindle for movement to and from each other is a pair of opposed, coplanar halving knives, and movable along the spindle is a pear pusher for discharging the processed pears from the spindle and through the halving knives. Disposed within the spindle is a stem core pusher clearing the spindle of the stem core contained therein.

Also mounted on the frame in a plane transverse to the plane of the halving knives is a pair of opposed pear holding jaws arranged to straddle a pear impaled and keyed on the spindle and to close on each other into gripping engagement with the pear.

By and large, all of the mechanics so far described are located adjacent to or forwardly of the intermediate vertical wall or partition of the machine frame. Mounted on the frame rearwardly of the intermediate wall are the various assemblies for driving and controlling the operating elements above discussed in proper sequence. Suffice it here to state that the drive and control mechanism serves to impale, key, and position a pear on the spindle while the spindle is held against rotation. Simultaneously, the pear feed assembly returns to its forward starting position to receive another pear, the spindle and the pear keyed thereto are rotated, the peeling knife traverses the rotating pear, and the stem-end trimming knife is brought into position over the stem end of the pear to cut the top therefrom. This having been done, and assuming that the end product desired is halved pears, the spindle is momentarily held against rotation while the pear-holding jaws are brought into gripping engagement with the pear. Following this, the spindle is again rotated with the result that the arcuate seed-cell coring knives cut the seed-cell pod from the body of the pear, the calyx-end trimmer reams out the calyx end of the pear, and the halving knives close on each other to halve the processed pear. Finally, the holding jaws are retracted, and the pear is moved forwardly over the closed halving knives, the halved pears are deflected into a receiving container, and the halving knives are returned to their fully open position. At some time during the cycle of operation, the stem-core pusher is advanced so as to clear the spindle of the stem core and then is retracted to its starting position.

In the event that the final product desired is a whole pear, the whole-pear coring knife is advanced into and then out of the calyx end of the pear while the pear is rotating so as to produce a cylindrical cut within the pear surrounding the seed-cell pod. The spindle is then momentarily held against rotation while the pear-holding jaws are brought into gripping engagement with the pear. While the pear is then held against rotation, the spindle is given one additional turn to enable a small wire knife mounted on the spindle immediately forward of the seed-cell pod zone to sever the seed-cell plug from the body of the pear. Except for this sequence of operation and the fact that the halving knives are inactivated, the operation of the machine for producing whole pears is identical with its operation for producing processed halved pears.

One of the objects of our invention is the provision in a machine of the general character above described of a hollow spindle provided with radial pear keying fins located forwardly of the seed-cell pod zone of a pear impaled on the spindle, wherein the seed-cell pod corer of the machine is carried by a corer sleeve mounted over the rear end of the spindle, and wherein provision is made for rotating the sleeve independently of the spindle and for periodically locking these two members together for concurrent rotation.

Another object of our invention is the provision in a machine of the character above described wherein the corer sleeve is detachably fixed to an outer drive sleeve; wherein the spindle is detachably secured to an inner driven sleeve journaled within the outer sleeve; and wherein a clutch assembly is operatively associated with the drive and driven sleeves for periodically locking the driven sleeve to the drive sleeve.

Still another object of our invention is the provision in a spindle and corer sleeve assembly of the character above described, of means operatively associated with said sleeve for positively indexing it relative to the spindle prior to locking these two members together for concurrent rotation.

A further object of our invention is the provision of a seed-cell pod corer sleeve provided with a pair of peripherally spaced, arcuate, longitudinally staggered, seed-cell pod coring knives, such knives being preferably disposed on opposite sides of said sleeve so as to balance the torque to which the sleeve is subjected during the seed-cell coring operation.

Still another object of our invention is the provision of a corer sleeve mounting an arcuate seed-cell coring knife and provided with one or more outwardly extending pins located within the seed-cell zone of the sleeve and which serves to macerate the seed-cell pod upon the relative rotation of the sleeve and the pear being processed.

Another object of our invention is the provision in a pear processing machine of the character above described of a carriage mounted on the frame for fore and aft movement adjacent the spindle of the machine and arranged to selectively mount either a whole pear seed-cell coring knife or a calyx-end trimmer, means being provided for deactivating said carriage when it is set for processing pears to be halved.

A still further object of our invention is the provision in a pear processing machine having a pear-sensing device associated with the spindle of the machine for determining the operating position of the pear on the spindle relative to its seed-cell pod, of means operable from a convenient point external to the machine for adjusting the fore and aft position of the sensing device relative to the size of pears being processed.

The invention possesses other advantageous features, some of which, with the foregoing, will be set forth at length in the following description where those forms of the invention which have been selected for illustration in the drawings accompanying and forming a part of the present specification are outlined in full. In said drawings, several forms of the invention are shown, but it is to be understood that it is not limited to such forms, since the invention as set forth in the claims may be embodied in other forms.

Referring to the drawings.

Figures 6, 7, 8:
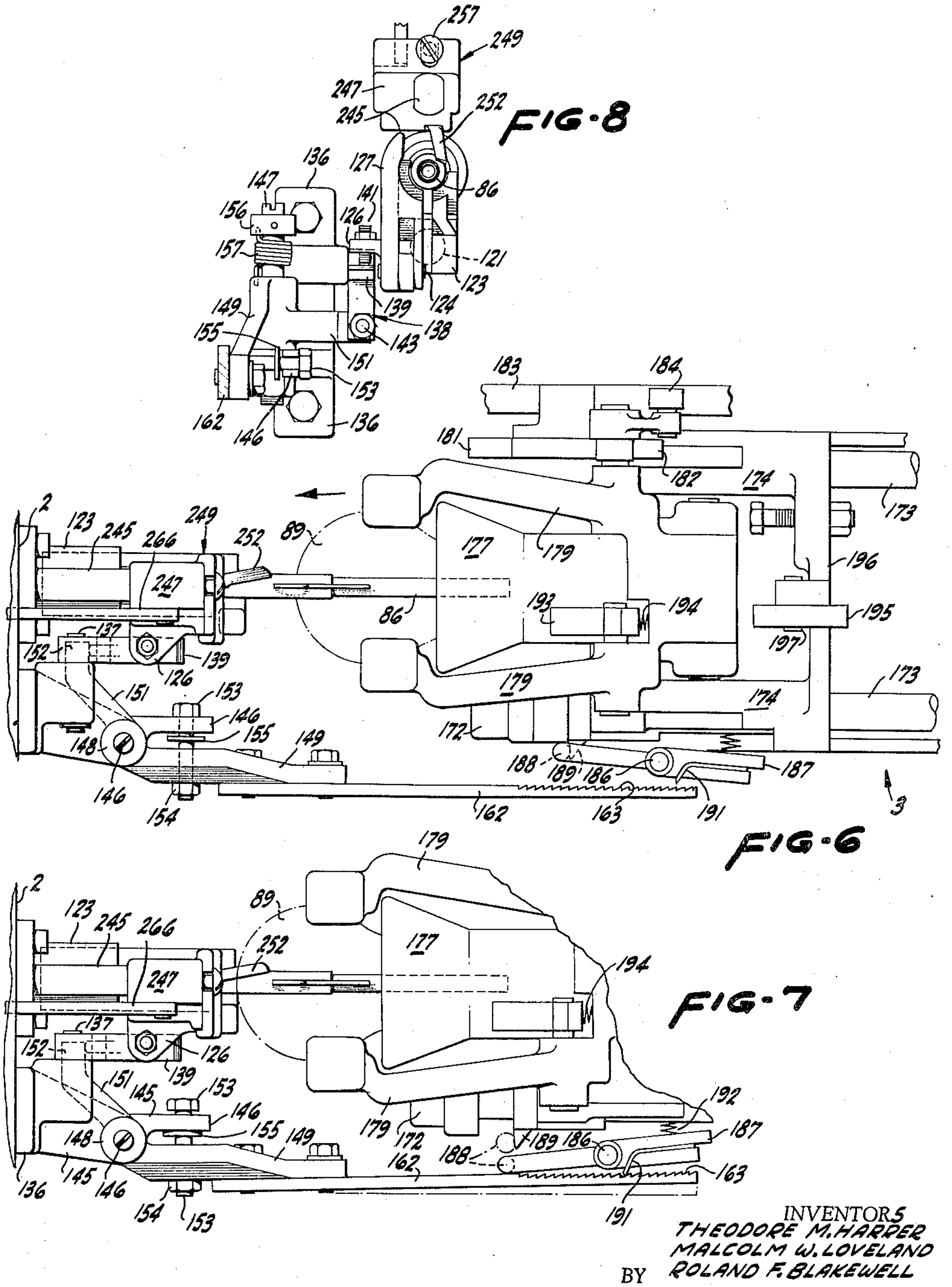
FIG. 6 is an enlarged fragmentary top plan view of the machine showing the pear-feed assembly in an intermediate position.
FIG. 7 is a top plan view similar to that illustrated in FIG. 6, but wherein the pear-feed carriage is shown in its rearmost and arrested position.
FIG. 8 is an enlarged fragmentary vertical section taken on the section line 8—8 of FIG. 1 but with the pear peeling head and knives removed.
Figures 15, 16, 17:
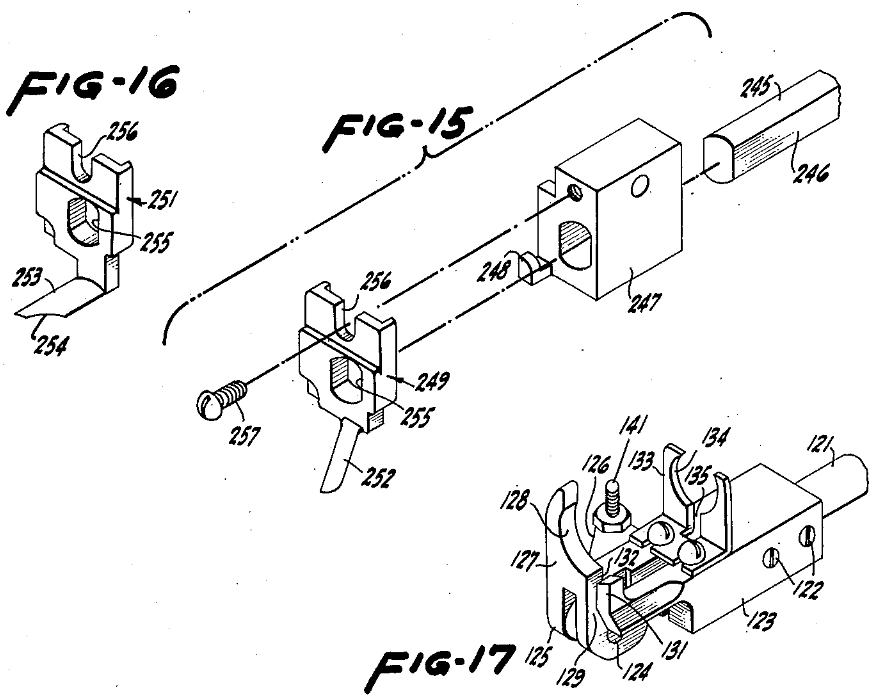
FIG. 15 is an enlarged exploded perspective view of the half-pear calyx-end trimmer assembly.
FIG. 16 is a perspective view of the whole pear-coring knife which can be selectively substituted for the calyx-end trimming knife unit of FIG. 15.
FIG. 17 is an enlarged perspective view of the pear-sensing, push-off, and wiping assembly.
Figure 18:
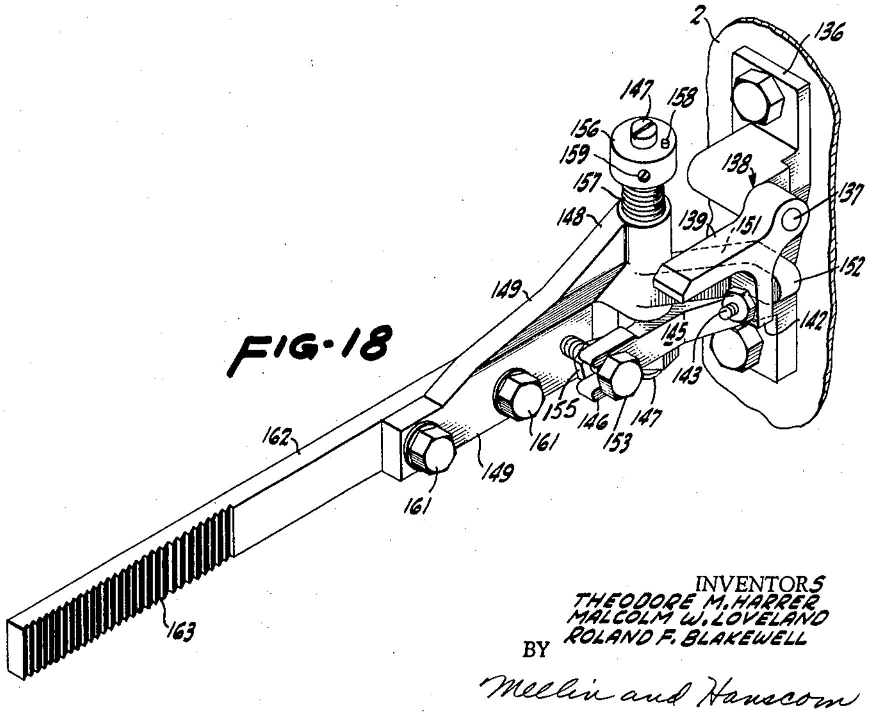
FIG. 18 is an enlarged perspective view of the pear carriage trip assembly serving to unlatch the pear carriage and reciprocating bed in response to the contact of a pear with the sensing member.

Here it should be noted that FIGS. 15, 17, and 18 may be considered as exploded views of the assemblies illustrated in front elevation in FIG. 8.

Figure 19:
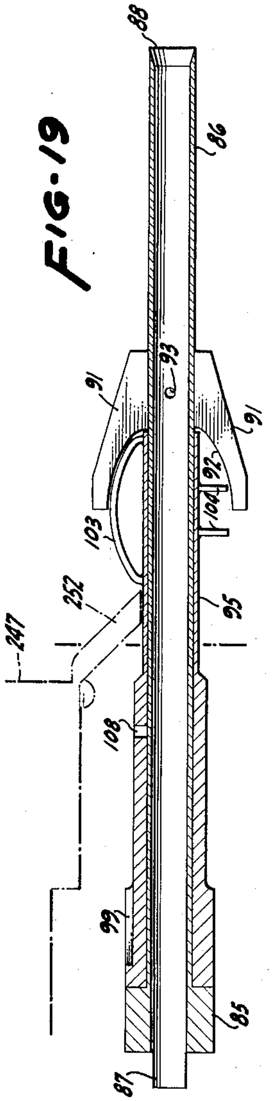

FIG. 19 is an enlarged, vertical mid-section taken through one form of the spindle and corer sleeve assembly for use in processing pears to be halved.

Figure 20:
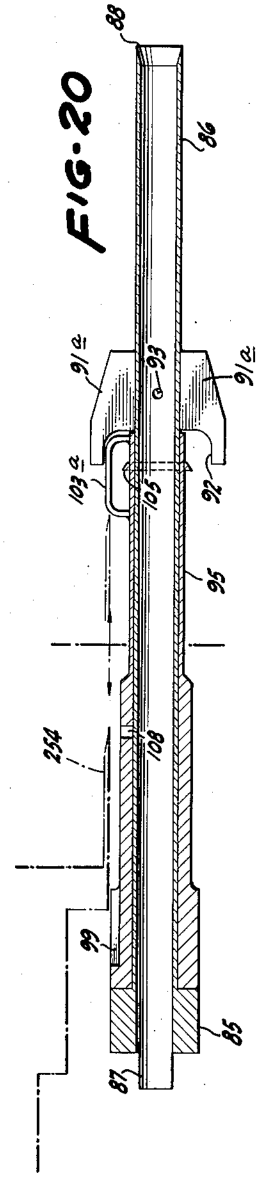

FIG. 20 is a vertical mid-section taken through a modified spindle and corer sleeve assembly for use in processing whole pears.

Figure 21:
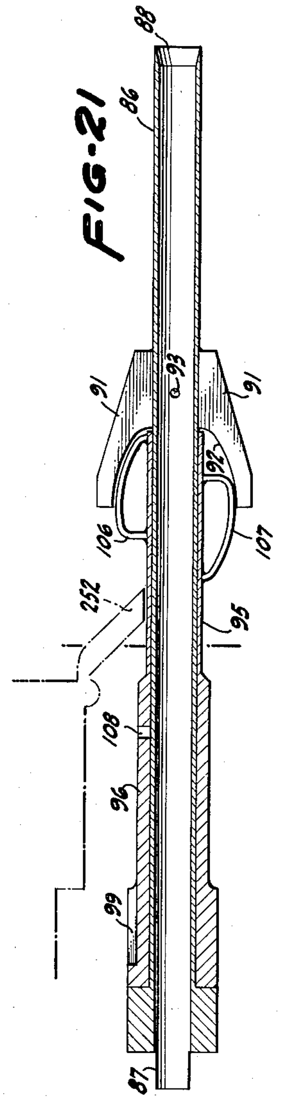

FIG. 21 is a vertical mid-section taken through a further modified spindle and corer sleeve assembly for use in processing pears for halving.

Figures 13, 14, 22, 23:
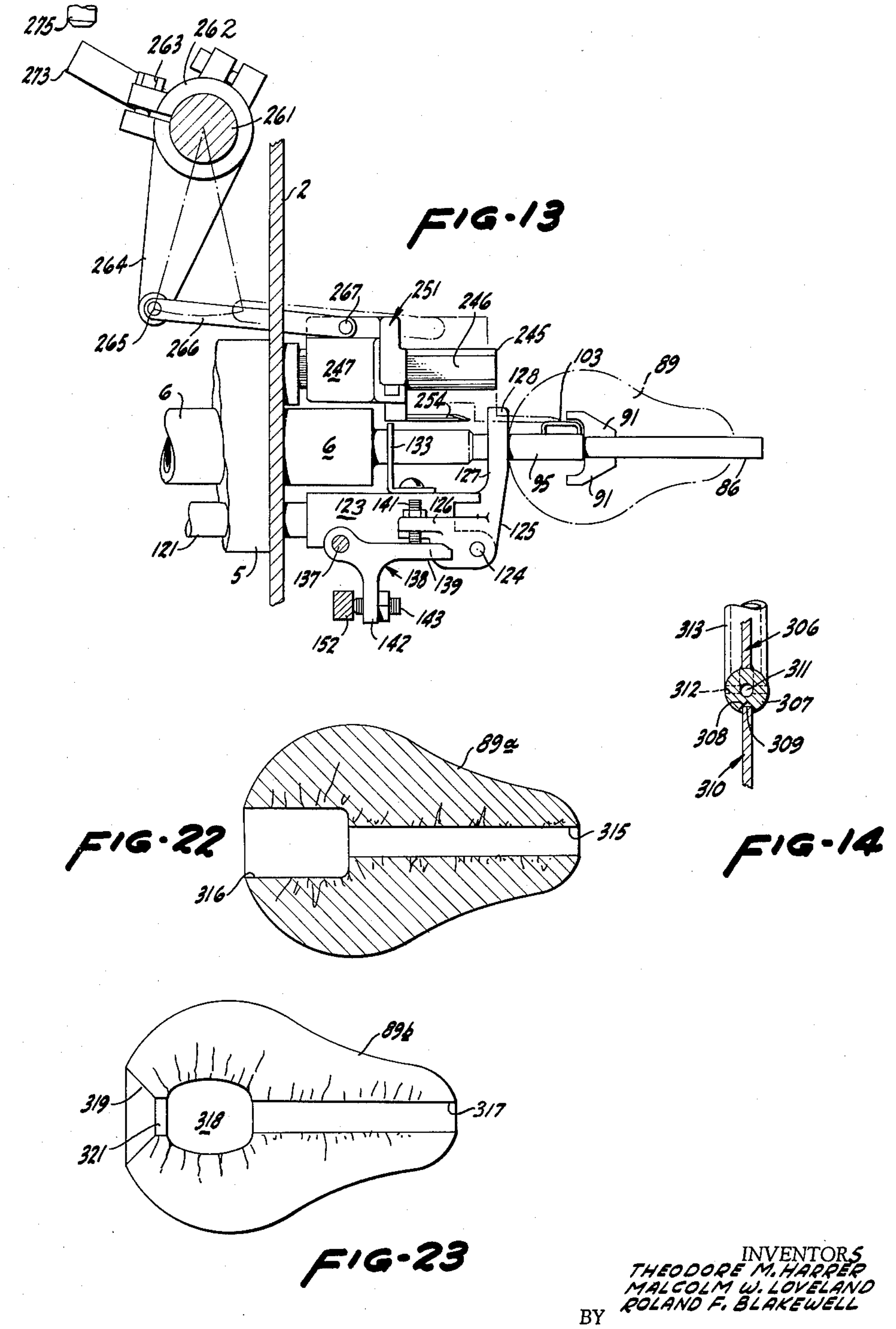
FIG. 13 is an enlarged fragmentary side elevation of the central processing station of the machine set up for whole pear coring and showing its pear-sensing assembly.
FIG. 14 is an enlarged fragmentary, substantially vertical section taken on the section line 14—14 of FIG. 1 through the forward end of the upper pear-halving knife.

FIG. 22 is a vertical mid-section taken through a whole pear as processed by our machine for dicing.

FIG. 23 is a plan view of a halved pear processed by our machine.

Figure 24:
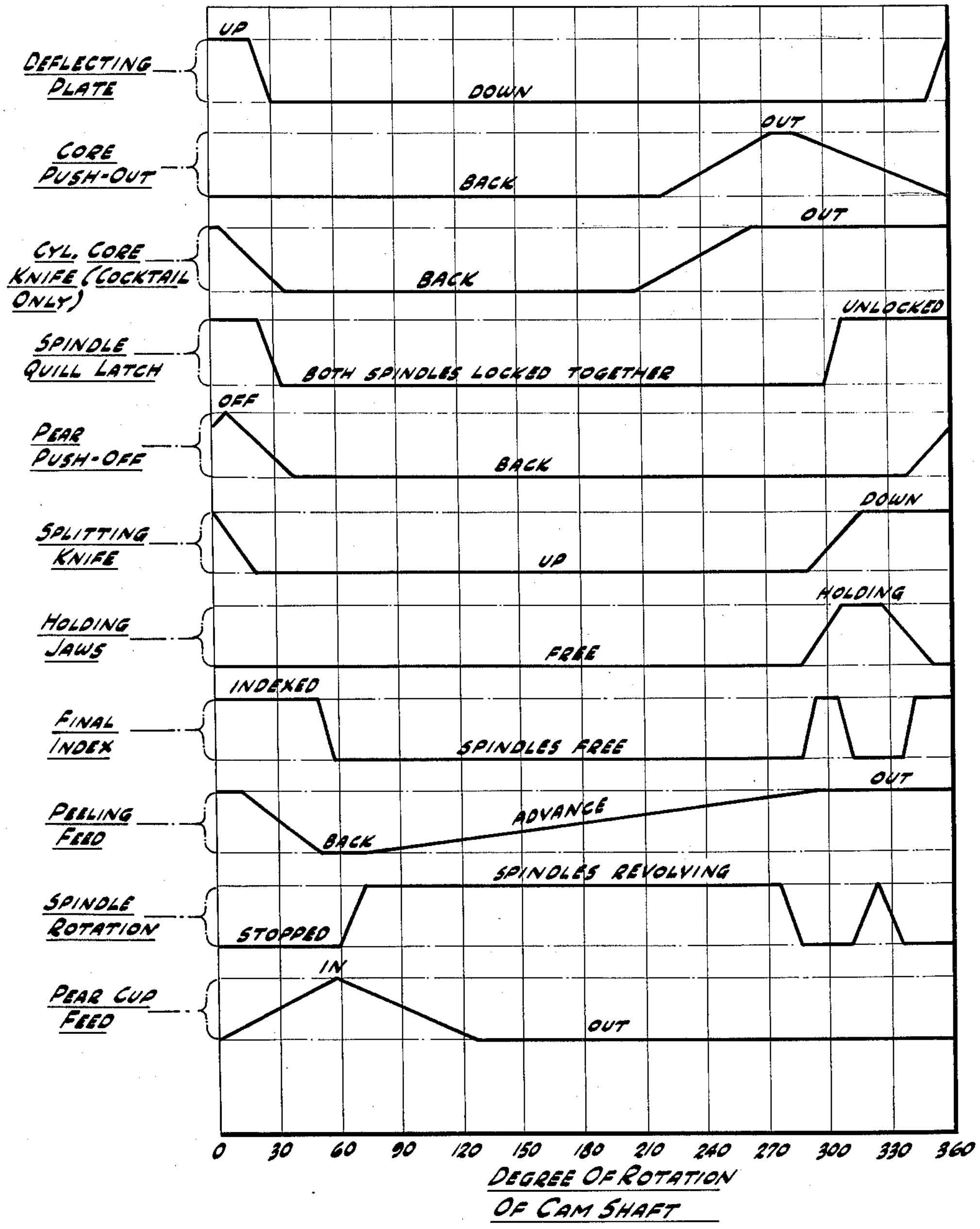

FIG. 24 is a diagram consisting of various curves showing the comparative sequence of operation of the various assemblies of our machine through one complete cycle of operation.

Figures 3, 4:
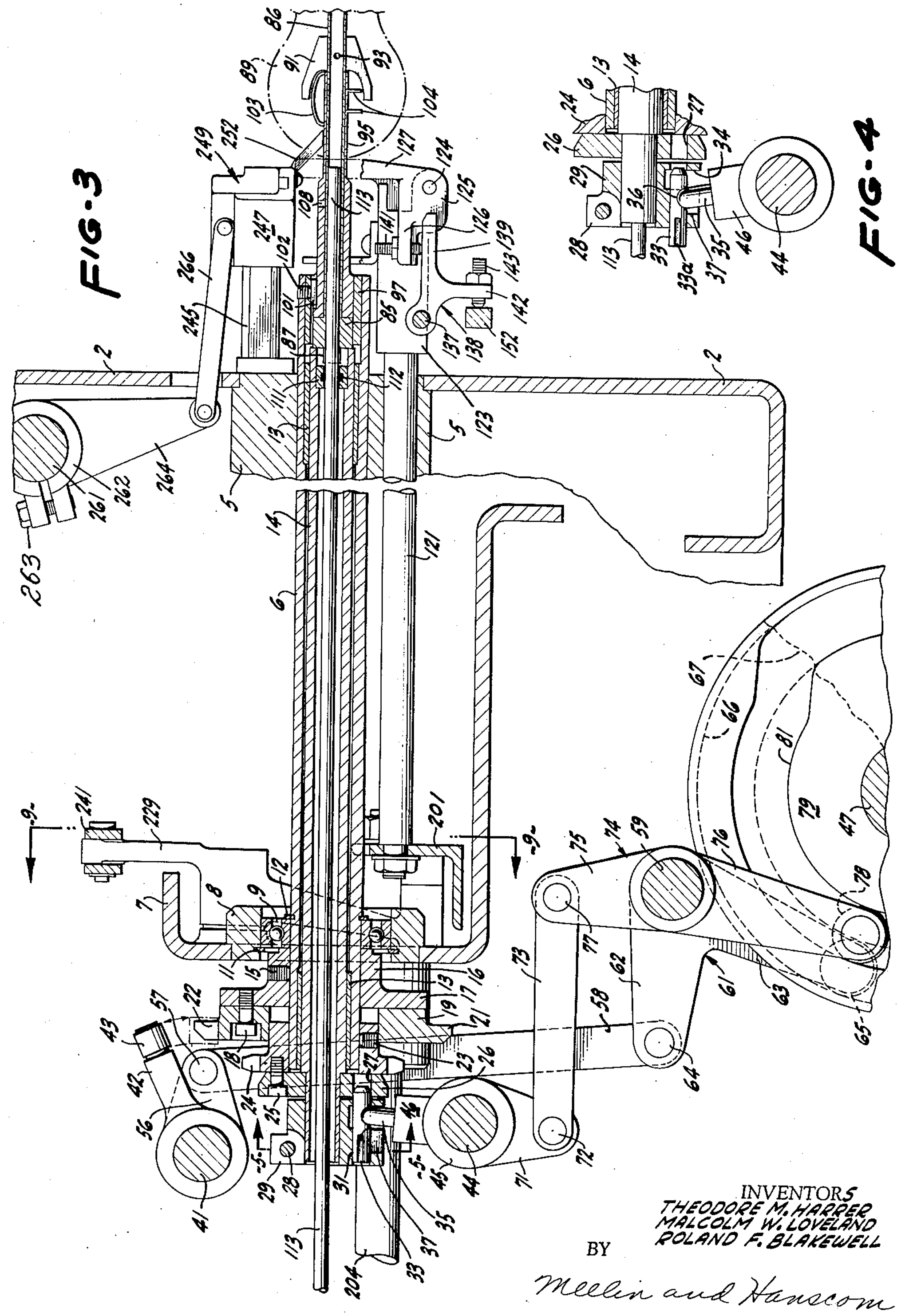
FIG. 3 is an enlarged fragmentary vertical section taken on the section line 3—3 of FIG. 2, but with the pear halving knives removed, and showing in the background corresponding and identical elements of a next succeeding unit.
FIG. 4 is a fragmentary vertical section similar to the extreme left-hand portion of FIG. 3, but showing the clutch mechanism in its unlocked position.

At the outset it should be observed that in the figures above described primarily only one pear processing unit has been illustrated and will herein be described although in actual use a bank in the order of six such units is incorporated in a single machine for simultaneous operation by a single attendant. In FIG. 3, for example, some of the elements of a next succeeding unit in the bank of units appear in the background.

*Frame*

Figure 1:
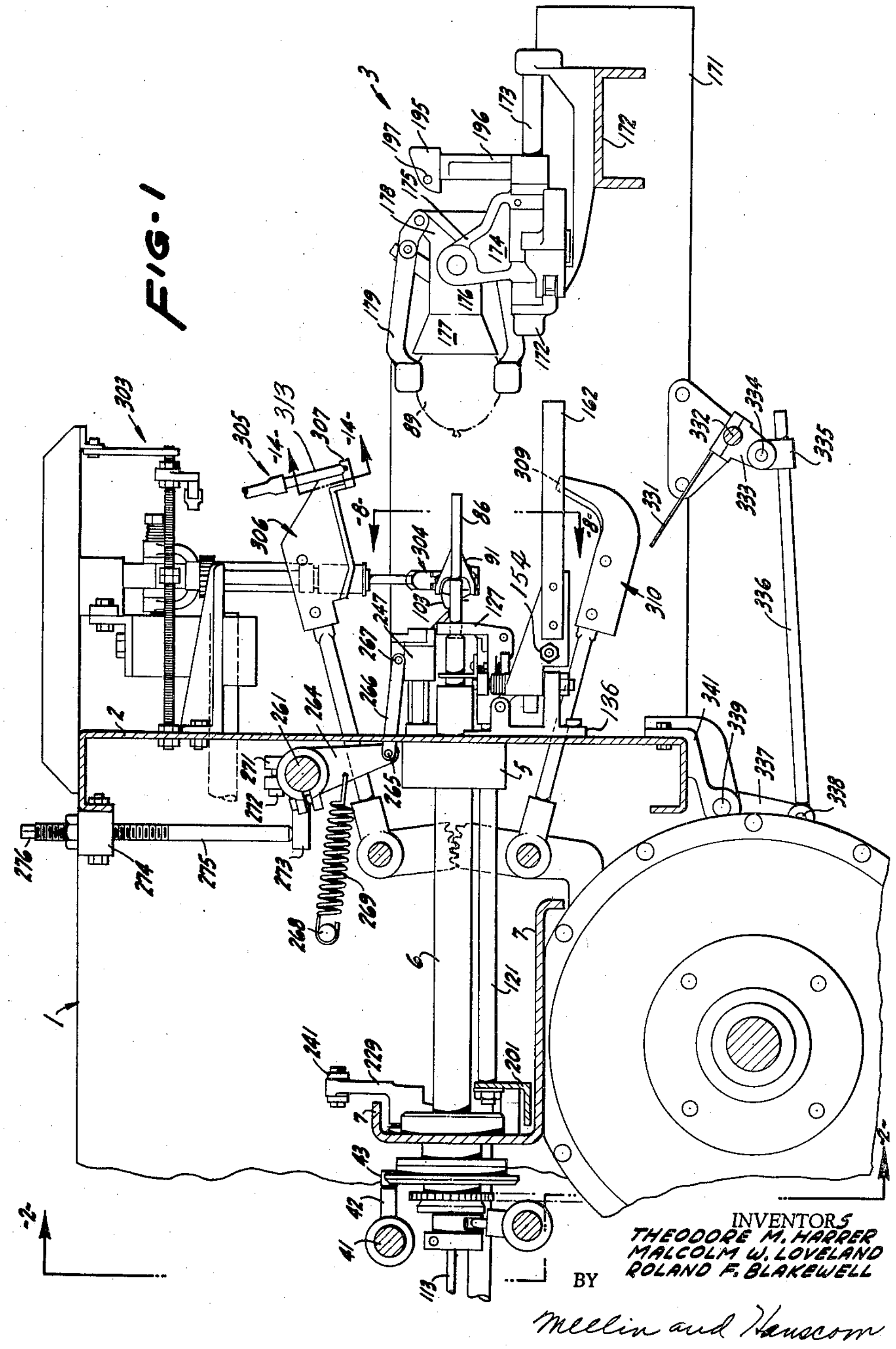
FIG. 1 is a fragmentary side elevation of a pear processing machine embodying the objects of our invention.

The unit illustrated in the accompanying drawings includes a generally box-shaped steel fabricated frame 1 including a vertical supporting wall or partition 2 located intermediate the front and rear ends of the machine, the pear feeding station of the machine, generally indicated by the reference numeral 3, being considered as the front of the machine (FIGS. 1 and 6). Here it might also be noted that the entire processing of a pear occurs forwardly of the supporting wall or partition 2 and that most of the mechanism for driving the machine is located generally to the rear of this partition.

*Spindle and Corer Sleeve Assembly*

Mounted in the partition 2 and extending rearwardly thereof is a bearing block 5, and journaled therein is a quill 6 having its front end extending substantially forward of the partition 2 (FIG. 3). Formed integrally with the frame 1 is a rigid frame extension 7 and a bearing collar 8 coaxial with the quill 6, and disposed between the collar 8 and the quill 6 is a ball bearing unit 9. Mounted in the collar 8 is a retaining snap ring 11 serving to hold one side of the bearing unit 9, the other side thereof being retained by a snap ring 12 mounted in the quill 6. As a result of this construction, it will be seen that the quill 6 has a two-point support, one at either end thereof, and that for the most part the quill is located rearwardly of the partition 2.

Affixed to and within each end of the quill 6 is a bearing sleeve 13, and journaled therein is a pear corer supporting sleeve 14.

Mounted on the quill 6 adjacent its rear end and secured thereto by a setscrew 15 is a collar 16 provided with a flange 17. Attached to the rear face of the flange 17 by screws 18 is an annular indexing collar 19 provided with a flange 21, and formed in the flange 21 is an outwardly flared indexing notch 22. Secured to the quill 6 by a setscrew 23 and within the confines of the annular indexing collar 19 is a sprocket wheel 24. Since the collar 19, as well as the sprocket wheel 24, is attached rigidly to the quill 6, the rotation of the sprocket wheel or the collar 19 will of necessity impart rotation to the quill.

Figure 5:
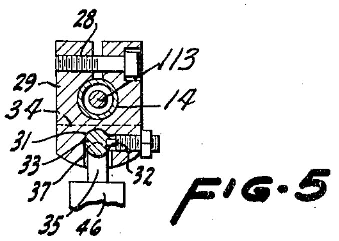
FIG. 5 is a fragmentary vertical section taken on the section line 5—5 of FIG. 3.

Fastened to the outer face of the sprocket wheel 24 by screws 25 and coaxially therewith is an annular collar 26 having positive clearance with the reduced stepped rear end of the corer supporting sleeve 14. Formed in the collar 26 is a longitudinally extending clutch hole 27. Secured to the reduced rear end of the sleeve 14 contiguous to the collar 26 by a bolt 28 is a split collar 29, and formed therein is a bore 31 arranged to be placed in axial alignment with the clutch hole 27, the bore 31 and the hole 27 being of identical diameters. Keyed within the bore 31 by a key 32 is a clutch pin 33 having a chamfered forward end and arranged to slide into and out of the hole 27 (FIGS. 3 and 5). Formed in the collar 29 intermediate its ends is an arcuate recess or channel 34 for the reception of an oscillating pin 35 chamfered at its forward end and receivable in a notch 36 formed in the sliding clutch pin 33. Here it should be noted that the radial depth of the arcuate recess 34 forms a continuation of the upper cylindrical surface of the collar 29 and is sufficiently deep to clear the pin 35 and to permit the collar 29 to rotate so long as the pin 35 is within the confines of the recess 34 and its upper end is accommodated within the notch 36. To properly position the notch 36, the pin 33 is provided with a keyway 33$^{a}$ for the reception of a key, not shown. Forward in the collar 29 below the pin 33 and in parallelism therewith is an open slot 37 for accommodating the pin 35 when said pin is in its left-hand position as viewed in FIG. 4. Although when in this position the pin 33 is in its retracted position in so far as the hole 27 is concerned, the pin 35 is locked in the slot 37 to thereby positively hold the corer sleeve 14 against rotation during the independent rotation of the spindle 6. The clutch pin 33 therefore serves as a means for locking the quill 6 to the corer supporting sleeve 14 so that the sleeve will rotate with the quill. With the clutch pin 33 in its retracted position, the quill 6 can be driven independently of the corer supporting sleeve 14, and in this position the pin 35 serves to lock the collar 29 against rotation.

Extending transversely across the frame 1 and journaled therein is a shaft 41. Fixed to the shaft 41 (FIGS. 2 and 3) adjacent the indexing collar 19 is a finger 42, and mounted on the free end thereof is an indexing roller 43 receivable in the notch 22 and serving to rotate the collar 19 and hence the quill 6 to a predetermined angular position. The means for actuating the shaft 41 will be presently described in conjunction with a description of the drive for the machine.

Similarly journaled in the frame 1, transversely thereof and beneath the rear end of the quill 6 and its associated parts, is a shaft 44. Fixed to the shaft 44 is a collar 45 formed with a radial boss 46 serving as a mounting for the oscillating clutch pin 35.

*Main Drive*

Journaled in the frame 1 and extending transversely thereof is a main drive shaft 47. Operatively associated with the shaft 47 and serving to drive it at a reduced speed is a gear box 48 including a pulley wheel 49. Surrounding the pulley wheel 49 is a drive belt 51 arranged to be driven by a pulley associated with a suitable electric motor, not shown.

Operatively associated with the shaft 47 is a programming gear box 52 which may be of conventional and known construction and includes a sprocket wheel 53 Reeved about the sprocket wheel 53 and the sprocket wheel 24 is a chain 54. The sole function of the programming gear box 2 is to rotate and stop the quill 6 during predetermined intervals during each complete cycle of operation of the machine as clearly appears from a consideration of the diagram of FIG. 24. Since programming gear boxes of this character are known in the art, a more detailed description thereof is deemed to be unnecessary. All of the other operating elements of our machine are driven through suitable cam tracks and cam followers operating in response to the rotation of the main drive shaft 47 at a constant speed.

*Indexing Drive*

Figure 2:
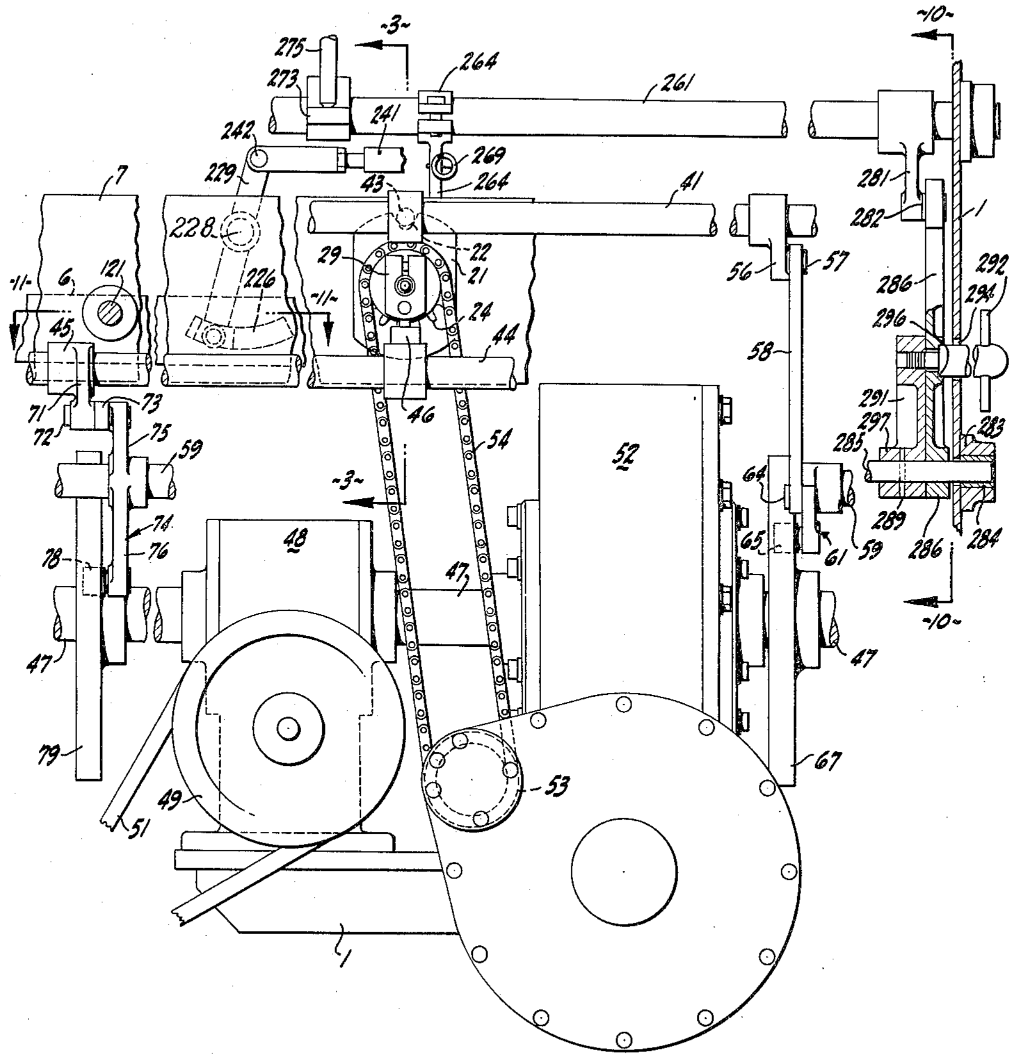
FIG. 2 is a fragmentary rear end elevation of the pear processing machine illustrated in FIG. 1 or FIG. 2, and may be considered as a vertical section taken on the offset section line 2—2 of FIG. 1.

Now referring back to shaft 41 to which the indexing roller is affixed. Affixed to the shaft 41 (FIG. 2) is a crank 56, and pivoted to the end thereof by a pin 57 is the upper end of a link 58. Mounted on the frame 1 transversely thereof in parallelism with the shafts 41 and 47 is a shaft 59 (FIG. 3), and journaled thereon is a bell crank 61 having a rearwardly extending lever 62 and a downwardly extending lever 63. Pivoted to the free end of the lever 62 by a pin 64 is the lower end of the link 58. Journaled on the outer end of the lever 63 is a cam follower roller 65 arranged to traverse a cam track 66 formed in a cam disc 67, the cam disc 67 being keyed or otherwise affixed to the main drive shaft 47. The contour of the cam track 66 should be such as to effect indexing in accordance with the curve entitled "Final Index" shown in FIG. 24. It should here be noted that although not here shown, the processing machine herein illustrated actually consists of a bank of identical processing units and that more particularly there is mounted on the left end of the shaft 47 as viewed in FIG. 2 another cam disc 67, that the shaft 41 carries another crank 56, and that these additional members are all interconnected as illustrated in FIG. 2. It is for this reason that the link 58, bell crank 61, lever 58, etc., appear in the background in FIG. 3, and it is for this reason that FIG. 3 can properly be described as a section taken on the section line 3—3 of FIG. 2.

*Clutch Drive*

Now referring back to the shaft 44 to which the oscillating collar 45 and its pin 35 are fixed for rotation therewith. Keyed or otherwise secured to the shaft 44 is a crank 71, and pivoted to the free end thereof by a pin 72 is a forwardly extending link 73. Journaled on the shaft 59 is a second bell crank 74 including an upwardly extending lever 75 and a downwardly extending lever 76. The free ends of the link 73 and the lever 75 are pivoted together by a pin 77, and the lower free end of the lever 76 mounts a cam follower roller 78. Fixed to the main drive shaft 47 is a second disc 79 provided with a cam track 81 arranged to receive the cam follower roller. Here again the contour of the cam track 81 should be such as to latch the quill 6 and the sleeve 14 in the sequence shown in FIG. 24 by the curve entitled "Spindle Quill."

So far, the quill and corer supporting sleeve assembly has been described together with the mechanism for indexing the quill and sleeve and for latching them together after they have been indexed. Now follows a description of the spindle and corer sleeve assembly, and here it should be noted that in a machine of the character here being described a pear is completely processed while keyed to the spindle and corer sleeve at a predetermined point thereon.

*Spindle and Corer Sleeve Assembly*

Interlocked with the forward end of the corer supporting sleeve 14 is the rear end of the hollow hub or shank 85 of a forwardly extending spindle 86 (FIGS. 3, 19, 20 and 21). Interlocking engagement of these two members is effected by simply forming their abutting ends with interfitting or interdigitated tongues 87 so that the rear end of the hub can be coupled to the forward end of the sleeve 14 by merely moving the spindle 86 rearwardly coaxially with the sleeve. The forward end of the spindle 86 is provided with a knife edge 88 so that a pear 89 can more readily be coaxially impaled thereon or with its stem core disposed within the spindle. As so far described, the three modifications of the spindles illustrated in FIGS. 19, 20, and 21 are identical.

Welded to each spindle 86 are coplanar, diametrically opposed, rearwardly extending and rearwardly diverging pear keying fins 91 each formed with an arch 92. The body of the fins 91 should be located immediately forward of the seed-cell zone of a pear 89 impaled on the spindle and operatively located thereon as indicated in FIG. 3. Here it is to be emphasized that although the seed-cell pod of a pear of a given grade is located at a predetermined distance from the calyx end of the pear, this distance is actually a function of the length of the pear. Since pears of different grades have to be processed, different spindles and sleeves have to be used and it is for this reason that these members should be readily interchangeable and removably mounted on the quill assembly. It should also here be noted that the fins 91 are over the forward end of the seed-cell pod for the reason that at this point the pear is stronger than at a point adjacent the calyx end of the pear, particularly after a cut has been made around the seed-cell pod. This construction therefore avoids the tendency of the pear to split at its calyx end during the processing operation by applying the turning torque to the pear at its forward end.

Formed in the spindle 86 at a point adjacent the fins 91 is an air eduction or vent hole 93 serving to permit the escape of air entrained within the spindle as the pear 89 is being impaled on the spindle.

Slidably disposed over the spindle 86 for rotation thereon is a corer sleeve 95 formed at its rear end with a stepped shank 96. Fixed within the forward end of the quill 6 is a bushing 97, and formed therein and in the shank 96 is a keyway 99 (FIGS. 3, 19, 20, and 21). Slidably receivable in the keyway 99 is a key 101 (FIG. 3), and threaded through the quill 6 and its bushing 97 is a setscrew 102 bearing on the key 101 and serving to hold it in place. This structure therefore serves as a means for detachably locking the corer sleeve to the quill 6 for rotation therewith under the control of the programming gear box 52, and provided that the indexing roller 43 is in its retracted position.

From an inspection of FIGS. 19, 20, and 21, it will be seen that the forward end of the corer sleeve 95 terminates just short of the bodies of the fins 91 or **91*a*. In the modifications illustrated in FIGS. 19 and 20, the sleeves 95 are respectively provided with arcuate wire seed-cell pod coring knives 103 and 103*a* respectively, the forward end of each knife being disposed within the confines of the arch of the fins. In the modification of FIG. 19, the spindle 86 is provided with a pair of longitudinal seed-cell core disintegrating pins 104 disposed diametrically opposite the wire knife 103. In the modification illustrated in FIG. 20, the sleeve 95 is provided at a point intermediate the ends of the arcuate wire knife 103*a* with a rearwardly flaring ring 105**, the function of this ring being to readily permit a pear to be impaled over the sleeve but to restrain a whole pear seed-cell core from being pulled therefrom when a processed pear is being discharged.

Secured to the sleeve 95 of the modification of FIG. 21 is a pair of diametrically opposed, longitudinally staggered, arcuate wire seed-cell coring knives 106 and 107 which upon rotation of the sleeve generate a surface of revolution arranged to encompass the seed-cell pod of a pear impaled on the spindle. In this modification, the cutting torques imposed on the two knives are balanced and the need of seed-cell core disintegrating fins is dispensed with, for their function is taken over by the inner radial legs of the knives.

Formed adjacent the forward end of the sleeve shank 96 is a radial hole 108 for permitting the ingress of water for lubricating the contacting surfaces of the spindle and the sleeve. Here it should be noted that during the operation of the machine water is available at this point.

Here it should also be noted that one of the functions of the indexing mechanism previously described, including the indexing roller 43, is to so index the spindle 86 and the coring sleeve 95, that the plane of the diametrically opposed fins 91 lie in the vertical plane containing the arcuate wire coring knives and the distintegrating pins 104. Furthermore, this indexing should occur with this common plane coinciding with the plane containing the pear-halving knives (to be presently described), all as indicated in FIG. 13.

*Stem-Core Pusher Assembly*

As a pear is coaxially impaled on the spindle 86 and over the coring sleeve 96, the spindle 86 makes a cylindrical cut around the stem core, through the seed-cell pod, and through the calyx end of the pear. During each cycle of operation of the machine it is necessary to discharge the resulting so-called stem cores from the spindle. To this end, there is affixed within the forward end of the sleeve 14 substantially in the plane of the frame partition 2 as hollow annular ring 111, and seated therein is an O-ring 112. Slidably disposed in the spindle 86 and in the O-ring 112 is a stem-core push rod 113 (FIG. 3). As shown in this figure, the rear end of the push rod extends through the rear end of the sleeve 14, and although not illustrated in the drawings, the rear end of the rod is arranged to be reciprocated back and forth once during each complete cycle of the machine by any well-known cam track and follower assembly actuated by the rotation of the main drive shaft 47. Such a mechanism is, for example, illustrated in the copending application of Coons et al. Serial No. 447,076, filed August 2, 1954, now Patent No. 2,901,014; or in the Coons et al. Patent No. 2,742,067, dated April 17, 1956.

*Pear Sensing and Push-off Assembly*

Since one of the requirements of a machine of the character being described is that its pear-feeding mechanism impale a pear on the spindle coaxially therewith and locate it at a predetermined point on the spindle, and since pears being processed differ greatly in hardness, the machine must be provided with means for sensing the calyx end of the pear when it has reached such predetermined point regardless of the hardness of the pear, or more specifically, regardless of its softness. This is an important factor for the reason that the calyx end of a soft pear can be compressed or squashed if forced against a fixed stop or a stop which yields only in response to a substantial pressure. Further, the position of such a sensing member relative to the seed-cell core of a pear should be readily adjustable from a convenient point external to the machine so that the machine can be quickly set to gauge pears of different grades.

To this end, and for the further purpose of discharging a processed pear from the machine, a reciprocating push-off shaft 121 disposed in the vertical plane of the spindle 86 and beneath the spindle 86 is slidably mounted in the bearing block 5 (FIGS. 1, 3, 8, and 13). Secured to the forward end of the shaft 121 by screws 122 is a generally rectangular supporting block 123 (FIG. 17), and pivoted to the forward end thereof by a pin 124 is a crank generally designated by the reference numeral 125. Included in the crank is an upwardly extending arm 127 provided with an arcuate upper end 128 arranged to partially surround the corer sleeve 95 and to therefore be engaged by the pear 89 being impaled on the spindle 86 and over the forward end of the corer sleeve 95. As a result of such engagement and any further rearward increment of movement of the pear, the crank 125 will be caused to rotate counterclockwise as illustrated in FIGS. 3 and 13. Here it should be observed, particularly from FIG. 17, that the inner side 129 of the arm 127 is substantially offset with respect to the vertical plane of the machine (vertical plane containing the axis of the spindle 86 and the reciprocating shaft 121), and the forward end of the block 123 is formed with an upwardly extending finger 131 paralleling the inner side 129 of the crank 125, but laterally offset therefrom so as to form a channel or slot 132.

The function of this slot is simply to permit the block 123 to clear the lower spindle fin 91 when the block is advanced forwardly a distance equal to the length of a pear for the purpose of discharging a whole processed pear from the spindle or for the purpose of discharging and forcing a whole pear past the halving knives in the event that the end product desired is halved pears.

Mounted on the upper face of the block 123 is a corer-sleeve wiping member 133 provided with a central opening 134 arranged to pass over and wipe the corer sleeve 95 and provided with a slot 135 arranged to clear the lower fin 91 of the sleeve 95. During the pear push-off cycle of operation of the machine the spindle 86 and its corer sleeve 95 are so indexed that the fins 91, coring knives 103 or 106 and 107, and the disintegrating pins 104 all lie in a vertical plane, the common plane of the slots 129 and 135 and also the halving knives to be presently described.

Bolted to the frame partition 2 is a bracket 136, and pivoted thereto by a pin 137 is a second crank 138 having a forwardly extending arm 139 underlying the rear end of the arm 126 of the crank 125 and arranged to be engaged by an adjusting screw 141 threaded in the arm 126. Also included in the crank 138 is a depending arm 142 likewise provided with an adjusting screw 143 (FIGS. 3, 6, 7, 8, 13, and 18). As a result of this construction, a counterclockwise rotation of the crank 125 in response to being contacted by a pear will result in the clockwise rotation of the crank 138, as viewed in FIGS. 3 and 13.

Formed integrally with the bracket 136 and extending forwardly therefrom is a rigid, laterally offset arm 145 having a bifurcated outer end 146. Pivoted to the arm 145 intermediate its ends by a fixed pin 147 (FIG. 18) is a crank 148 including a forwardly extending arm 149 and a rearwardly extending arm 151. Formed on the free end of the arm 151 is a transversely extending foot 152 located adjacent the outer end of the depending arm 142 of the crank 138 and arranged to be engaged by its adjusting screw 143. As a result of this construction, a counterclockwise rotation of the pear-sensing arm 127, as viewed in FIG. 13, will result in a counterclockwise rotation of the crank 148, as viewed in FIGS. 6 and 7.

Extending through the bifurcated end 146 of the supporting arm 145 and screwed into an adjacent portion of the crank arm 149 is a bolt 153 locked in any desired adjusted position by a nut 154 (FIGS. 1 and 18). Formed integrally with the bolt 153 and between the bifurcated end 146 and the arm 149 is a shoulder 155 serving to limit rotation of the crank 148 relative to the fixed offset arm 145.

Threaded over the upper end of the fixed screw 147 is a nut 156 and surrounding the screw 147 between the nut 156 and the hub of the crank 148 is a coiled tension spring 157. The lower end of the spring 157 is anchored to said hub, and its upper end 158 is anchored to the nut 156. Threaded into the nut 156 is a threaded setscrew 159 engaging the screw 147 and serving to lock the nut 156 to the screw 147 in any desired angular position. As a result of this construction, the coil spring 151 serves to bias the arm 149 clockwise.

Secured to the crank arm 149 by bolts 161 is a forwardly extending carriage trip arm 162 provided on its inner vertical face with a series of forwardly inclined ratchet teeth 163.

*Pear Orienting and Feed Assembly*

Although in the cycle of operation of our machine, the orienting and feeding operations occur first, the description of the mechanism for effecting the two steps has been held in abeyance pending the description of the spindle, coring sleeve, and pear-sensing assemblies for the reason that the entire processing of the pear occurs when the pear has been properly located on the spindle. The spindle and its immediately associated assemblies are therefore the heart of the machine, and the orienting and feed assemblies are merely auxiliary equipment geared to the spindle for delivering an oriented pear to the spindle and corer sleeve coaxially therewith.

Furthermore, it is to be here noted that the orienting and feed assembly here described is old in the art and is disclosed in said Coons et al. application Serial No. 447,076 and therefore per se cannot be claimed by applicants. It is described herein merely as typical of equipment necessary to the complete operation of applicants' machine.

As shown in the drawings and disclosed in the prior art, this equipment includes a forwardly extending frame portion 171 on which is mounted a transversely extending carriage bed 172 arranged to reciprocate fore and aft in parallelism with the axis of the spindle 86 and in substantial alignment therewith (FIGS. 1 and 8.) Included as a part of the bed 172 is a pair of transversely spaced, parallel ways 173, and slidably mounted thereon for fore and aft movement relative thereto is a carriage 174. Since the carriage slides on the ways 173, it is capable of a lost motion relative thereto and to the frame. Mounted on the carriage 174 is a bearing frame 175, and pivoted thereto on a transverse pinion 176 is a pear-receiving cup assembly 177. Pivoted to the extensions 178 of the cup 177 are two pairs of pear-centering fingers 179. Mounted on the frame extension 171 is a cam track 181, and pivoted to the cup assembly 177 is a cam follower roller 182 arranged to traverse the cam track 181. The contour of the cam track 181 is such as to cause the cup assembly 177 to assume a vertical pear-receiving position when the carriage is in its forward position and to assume a horizontal position when traveling rearwardly towards the spindle 86. The cup assembly is so located that when a pear is centered in its cup and gripped by the fingers 179 the stem of the pear will be coaxial with the spindle 86.

Affixed to the frame extension 171 is a second cam track 183, and traversing said track is a second cam follower roller 184 mounted on one of the pear-centering and holding fingers 179, the contour of the cam track 183 being such as to cause the two opposed pairs of centering fingers 179 to move to their open position when the pear 89 gripped thereby has been fully impaled on the spindle.

Mounted on the carriage 174 by a vertical pivot pin 186 (FIGS. 7 and 8) is a rockerarm 187, and affixed to its forward end is a latch pin 188. Secured to the forward end of the reciprocating bed 172 adjacent the locus of the latch pin 188 is a fixed, forwardly inclined lug or detent 189. Secured to the rear end of the rockerarm 187 is an outwardly extending, rearwardly inclined dog 191 disposed adjacent the vertical plane containing the ratchet arm 162. Mounted between the rear end of the rockerarm 187 and the carriage 174 is a compression spring 192 serving to bias the front end of the rockerarm 187 inwardly with its pin 188 overlying and latched over the detent 189. If then the bed 172 is moving rearwardly towards the spindle 86 and its dog 189 is located behind the carriage latch pin 188, the bed 172 will pull the carriage along with it. This concurrent rearward movement of the bed and the carriage will continue until the blossom or calyx end of a pear 89 supported by the carriage engages the sensing arm 127 which will move rearwardly a slight increment, and the ratchet arm 162 will rotate counterclockwise as viewed in FIG. 6 so as to bring one of its teeth 163 into engagement with the dog 191 and thereby arrest the further rearward movement of the carriage. Simultaneously with this action the rockerarm 187 will rotate counterclockwise, as viewed in FIGS. 6 and 7, to thereby unlatch or release the rockerarm pin 188 from the reciprocating bed detent 189 and permit the reciprocating bed 172 to complete its fixed rearward stroke. Although the bed has a fixed stroke or amplitude of movement, the rearward movement of the carriage depends upon the length of the particular pear which is being fed to the spindle. When a processed pear has been pushed forwardly from the spindle the pear-sensing arm 127 will of course return to its home or starting position as likewise will the ratchet arm 162 (FIG. 6). Upon the return or forward stroke of the reciprocating bed, the rear end of the bed engages the rear end of the carriage and carries it back to its fixed forward starting or home position, and during and in response to this movement the pear cup assembly is made to assume a vertical pear-receiving position with its pear-orienting arms locked in their open position by a detent 193 spring biased by a coil spring 194 (FIG. 6) and through the action of a latch operator 195 pivoted to an upstanding bracket 196 by a pin 197. The bracket 196 is affixed to the cup carriage with its latch operator disposed in the locus of the detent 193. In this position the cup assembly is ready to receive a pear stem-end down. Upon the initial rearward movement of the carriage and the downward movement of the cup assembly to a horizontal position the pear-orienting and gripping arms 179 are unlocked and free to close on the pear under the biasing action of an intervening coil tension spring (not shown).

Reciprocation of the bed 172 to and from the spindle 86 can be effected in reponse to the rotation of the main drive shaft 47 through any suitable linkage such as, for example, an oscillating lever connected to the bed through a double rack, a pinion operatively associated with the double rack, a connecting rod mounting the pinion and connected to the free end of the oscillating lever, a cam follower mounted on the lever intermediate its ends, and a cam track rotating with the main drive shaft and serving to guide the cam follower.

As previously stated, the pear-feed and orienting assembly above described and its drive mechanism are well known in the art and as a matter of fact, have been in extensive use in the field (canneries) during the past three pear seasons.

At all events, it is this type of mechanism which serves once during each cycle of operation of the machine to feed a pear 89 to the spindle 86 coaxially therewith and into tripping engagement with the sensing arm 127 of the pear-sensing assembly and properly locate it on the spindle relative to the seed-cell pod of the pear.

*Pear-Sensing Assembly Reciprocating Mechanism*

The pear-sensing arm 127 serves not only as a sensing member but is arranged to perform the additional function of discharging or pushing processed pears from the spindle 86.

As previously described, the supporting block 123 is mounted on the rod or shaft 121 which in turn is slidably mounted in the bearing block 5 (FIGS. 1 and 3.) Attached to the rear end of the rod 121 is a transversely extending, fore and aft reciprocating angle arm carriage 201 (FIGS. 1, 3, 11, and 12). Secured to the frame extension 7 is a bearing block 202 provided with a bearing bushing 203, and slidably mounted therein is a rod 204. The forward reduced and threaded end of the rod 204 extends through the carriage 201 and is secured thereto by a nut 205. Threaded over the rear end of the rod 204 is a nut 206, and disposed forwardly of the nut 206 is a washer 207 serving as a set for a coil compression spring 208. Mounted on the rod 204 forwardly of the spring 208 is a backing washer 209 and a slide collar 211, the forward end of the collar 211 being seated against a shoulder 212 formed on the rod 204. As a result of this construction, the collar is free to slide on the rod 204 from the shoulder 212 towards the rear end of the rod 204 against the biasing action of the spring 208. Formed on the collar 211 intermediate its ends is a pair of coaxial, diametrically opposed pins 213.

Keyed to the main drive shaft is a cam plate 214, and formed therein is a cam channel or track 215. Mounted over the shaft 47 is the forked end 216 of a lever arm 217, and journaled on the arm 217 intermediate its ends is a cam follower roller 218 disposed within the cam track 215. Journaled in the frame 1 and extending transversely across the machine is a shaft 219, and keyed thereto is a rockerarm 221. Formed on the upper bifurcated end of the rockerarm 221 are two pairs of forks 222 and 223 engaging the pins 213, the lower end of the fork 221 being pivoted to the free end of the arm 217 by a pin 224. As a result of this construction, the rod 204 reciprocates to and fro once during each cycle of this machine and is controlled by the contour of the cam track 215. Since the spring 208 serves as a lost motion connection between the rocker arm 221 and the rod 204, the stroke of the rod 204 can be adjusted relative to the fixed stroke of the rockerarms.

To this end an arcuate cam wedge 226 is secured to the rear face of the carriage 201 by bolts 227. Pivoted to the frame extension 7 (FIG. 9) by a pin 228 is a lever 229 provided at its lower end with a wedge-shaped cam follower 231 in sliding contact with the arcuate cam wedge 226. Bolted to the frame 1 is a yoke or sleeve 232 formed with a stepped bore 233, and accommodated therein is an internally threaded rod 234. Threaded in the rear end of the rod 234 is a bolt 235 provided with a flange 236 disposed within the bore 233. Pinned to the bolt 235 externally of the sleeve 232 is a collar 237, and formed on the extreme rear end of the bolt 235 are wrench faces 238. As a result of this construction, the rotation of the bolt 235 serves to move the rod 234 in and out.

Secured to the inner end of the bolt 234 by a pin 239 is one end of a toggle 241, the other end of such toggle being secured to the upper end of the lever 229 by a pin 242. By this means, the position of the cam follower 231 can be adjusted relative to the arcuate wedge 226 so as to limit the rearward stroke of the carriage 201 and perforce limit the stroke of the rod or shaft 121. Here it should be recalled that the forward end of the shaft 121 mounts the supporting block 123 to which the pear-sensing and push-off arm 127 is pivoted. For ease of adjustment, the adjusting mechanism above described (the mechanism illustrated in FIG. 9) should be accessibly located on an external portion of the machine so that the machine can be quickly adjusted to any desired grade of pears.

*Calyx-End Trimmer and Whole Pear Corer Assembly*

Mounted on the frame partition 2 in the vertical plane of the spindle 86 and above the axis thereof (FIGS. 3, 6, 7, 8, 13, 15 and 16) is a forwardly extending slide support 245 formed with diametrically opposed keying flats 246. Slidably mounted on the support 245 and keyed thereto is a mounting block 247 provided on one of its forward corners with a keeper 248. Selectively mounted over the forward end of the block 247 in engagement with the keeper 248 are knife heads 249 and 251 of identical construction, with the single exception that the head 249 mounts an inclined calyx-end trimming knife 252, whereas the head 251 mounts a horizontal, forwardly extending seed-cell coring knife 253 provided with a shearing cutting edge 254. Each of the heads 249 and 251 is provided with a central opening 255 for receiving the support 245, and each is formed with an open slot 256 for the accommodation of a screw 257 serving to secure a selected knife head to the mounting block 247.

Extending transversely across the machine rearwardly of the partition 2 and journaled in the frame 1 is a shaft 261. Fixed to the shaft 261 by a split collar 262 and a screw 263, is a lever 264. Pivoted to the outer end of the lever 264 by a pin 265 is the rear end of a link 266, the forward end of said link being connected to the slide block 247 by a pin 267. As a result of this construction, the slide block 247 can be made to reciprocate fore and aft by imparting an oscillating motion to the shaft 261.

Secured to the frame 1 by a pin 268 is the rear end of a tension spring 269, the forward end of such spring being attached to the lever 264 so as to bias the lever rearwardly and retract the block 247.

Clamped to the shaft 261 by a split collar 271 and a screw 272 is a stop finger 273. Bolted to the frame 2 above the finger 273 is a nut 274, and threaded therein is a screw 275 having adjustable engagement with the finger 273 and provided at its upper end with wrench faces 276. The screw 275 and the finger 273 therefore serve as an adjustable means for determining the stroke of the block 247 under the biasing action of the spring 269.

Figures 9, 10:
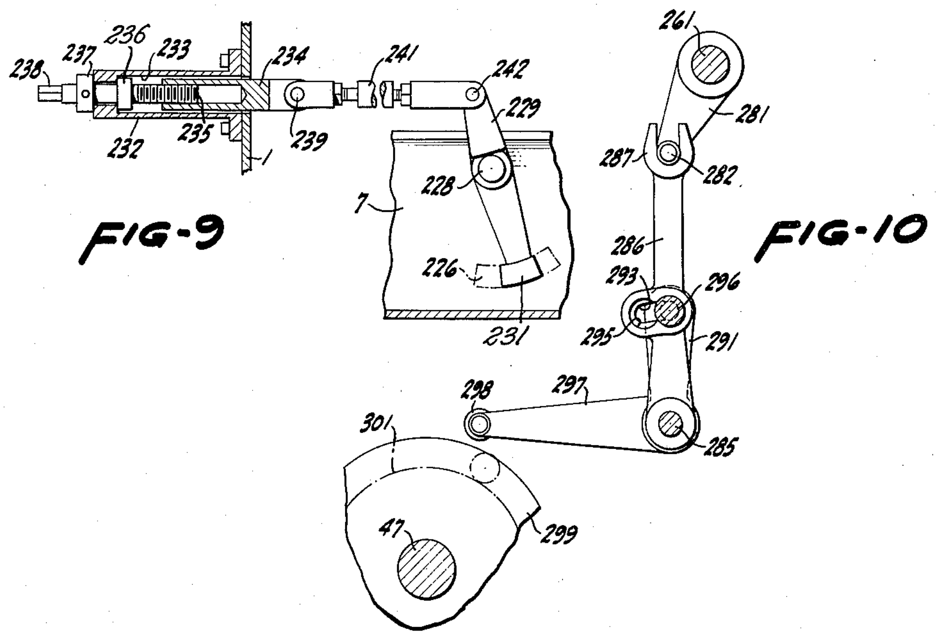
FIG. 9 is a fragmentary vetrical section taken on the section on reduced scale line 9—9 of FIG. 3.
FIG. 10 is a fragmentary vertical section taken on the section line 10—10 of FIG. 2.
Figures 11, 12:
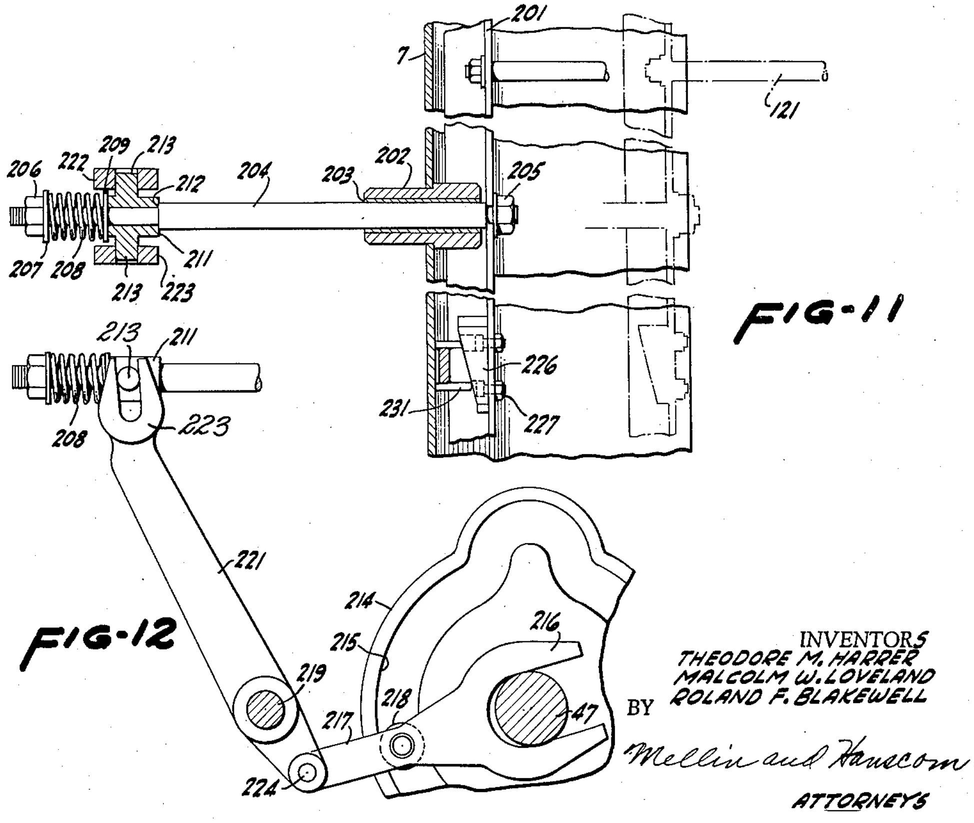
FIG. 11 is a fragmentary horizontal section taken on the section line 11—11 of FIG. 2.
FIG. 12 is a fragmentary vertical section taken transversely through the main drive shaft in a plane parallel to, but offset from the vertical plane containing the machine spindle.

As best shown in FIGS. 2 and 10, the shaft 261 mounts a lever 281 for rotation therewith, the lower end of the lever being provided with a transversely extending pin 282. Fixed to the frame 1 is a bearing block 283 provided with a bearing bushing 284, and journaled therein is a pin 285 (FIGS. 2 and 10). Mounted on the pin 285 is the lower end of a link 286, the upper end of this link being provided with a fork 287 arranged to straddle the pin 282 of the lever 281. Fixed to the pin 285 by a small pin 289 is a lever 291, and threaded to the outer end thereof is a T bolt 292 arranged to pass through a slot 293 formed in the link 286 and through a slot 294 formed in the frame 1. The slot 293, as best shown in FIG. 10, terminates at each of its ends in a circular counter sink 295 arranged to receive the shank or shoulder 296 of the T bolt 292. By this expedient, the link 286 can be locked tothe lever 291 in either one of two positions, depending upon which one of the two counter sinks 295 is used to accommodate the T bolt shoulder or shank 296.

Formed integrally with the lever 291 is a lever 297 and mounted on the outer end thereof is a cam follower roller 298. Keyed to the main drive shaft 47 is a cam disc 299, and formed therein is a cam track 301 arranged for engagement by the roller 298 when the T bolt shank is engaged in the left-hand sink 295 as viewed in FIG. 10. When in this position, the roller 298 will follow the contour of the cam track 301, the contour of this track being such as to oscillate the shaft 261 once during each cycle of operation of the machine. Here it should be noted that the spring 269 biases the shaft 261 in a clockwise direction, as viewed in FIGS. 1 and 10, and serves to urge the cam roller 298 against the cam track 301 when the crank formed by the lever arms 291 and 297 is locked in the position above described. However, when this crank is locked in the position shown in FIG. 10, the cam roller 298 is always out of contact with the cam track 301. Also, it should be noted that, as shown in FIG. 2, the handle of the T bolt 292 is located on one side of the machine and external to the machine frame 1 so that the cam roller 298 can be readily and selectively adjusted to one of its two positions, either out of or into engagement with its cam track. When the cam roller is locked out of engagement with its cam track, no oscillatory movement is imparted to the shaft 261 and the mounting block 247 is held in a fixed position with its associated calyx-end trimming knife extending into the calyx-end zone of the pear 89 so as to trim the calyx-end of the pear upon the rotating of the pear with the spindle. This adjustment of the machine is used when the end product desired is half pears and seed-cell coring is effected by means of the spindle and sleeve assemblies illustrated in FIGS. 19 and 21.

When the machine is adjusted for reciprocating the mounting block 247, either the calyx-end trimming knife 252 or the whole pear coring knife 254 can be used. However, the coring knife 254 must at all events be used in the manner as indicated in FIG. 24 by the curve designated as "Cyc. Core Knife (Cocktail only)." In other words, calyx-end trimming can be effected by either holding the trimming knife 252 stationary or by letting it reciprocate to and fro, whereas in seed-cell coring for whole pears (cocktail fruit) must always be effected by advancing the knife 254 into its coring position once during each cycle of operation of the machine.

*Pear Peeling Assembly*

Mounted over the frame partition 2 and forwardly thereof is a pear peeling assembly generally designated by the reference numeral 303 (FIG. 1) and which is substantially identical with the structure disclosed in the formally allowed application Serial No. 542,612 of Coons et al. filed October 25, 1955, now Patent No. 2,860,676, and which has been in commercial use for several years. Suffice it here to point out that this assembly includes a peeling knife head 304 mounting an arcuate peeling knife and arranged once during each cycle of operation of the machine to contact and follow the contour of a pear from its calyx end to its stem so as to cut a ribbon of skin from the pear, all as indicated in FIG. 24 by the curve entitled "Peeling Feed."

*Pear Halving and Keying Knife Assembly*

Also incorporated in our machine is a pear halving and keying assembly generally designated by the reference numeral 305 and which, with two exceptions, is substantially identical with the corresponding structure disclosed in FIG. 1 of the Coons et al. application Serial No. 549,009 filed November 25, 1955, and which presently contains a number of allowed claims and can therefore be expected to issue as a patent in due course. This structure has been in commercial operation for several years and is therefore well known in the art and hardly needs further description is so far as its general construction and operation is concerned.

As in the case of the Coons et al. structure, this knife assembly includes a pair of opposed coplanar knives 306 and 310 mounted for concurrent movement towards and away from each other in accordance with the curve of FIG. 24 designated as "Splitting Knife."

Mounted on the stepped forward edge of the upper knife 306 is a small cylinder or anvil 307 (FIG. 14) formed along its lower edge with a downwardly flaring or diverging centering notch 308. As shown in FIG. 14, the function of the notch 308 is to guide the upper forward edge 309 of the lower knife 310 into coplanar relationship with the upper knife 306. This is of importance for when the knives are closed upon each other, it is essential that they be coplanar with each other and also with the keying fins 91. This structure is considered to be novel and is one of the exceptions above referred to.

Formed in the cylinder 307 is an axial chamber 311 intersecting a transverse bore 312 extending through a diameter of the cylinder and serving as a spray orifice or nozzle. Secured to the cylinder 307 and communicating with the chamber 311 is a tube 313 arranged to be periodically connected with a suitable source of fluid under pressure (not illustrated). The function of this structure is to subject the core of a processed pear to a fluid spray emanating from the ends of the bore 312 during such time as the processed pear is being discharged from the machine. This feature is likewise considered to be novel and constitutes the second exception above eluded to.

Pear halving is effective not only as a result of the halving knives' closing upon themselves, but also as a result of discharging a pear forwardly through the closed knives. In their closed position, the halving knives aid in holding a pear against rotation for the contours of the cutting edges thereof are such that they do not completely sever the pear. Aside from these two exceptions, the halving knife assembly is of well-known construction and needs no further description.

When the end products desired are whole pears for cocktail fruit, the halving knives are simply deactivated in their retracted positions by disengaging their cam track and cam follower roller mechanism.

FIG. 22 is merely illustrative of a mid-section taken through a processed whole pear 89$^a$ showing its cylindrical stem core cavity 315 and its cylindrical seed-cell core 316 cavity as produced by the action of coring knife 254 and the coring knife 103. Here it should be observed that one of the functions of the knives 103 and 103*a* is to cut the forward end of the seed-cell core from the pear body. Calyx-end trimming is of course not required when a cylindrical seed-cell core is cut from a pear.

FIG. 23 is representative of a processed halved pear 89$^b$ showing its semicylindrical stem core cavity 317, its arcuate seed-cell core cavity 318, and its rearward flaring calyx-end trim depression 319. Here it should be particularly noted that the depression 319 is separated from the cavity 318 by a neck or bridge 321 of pear flesh. It is essential when pears are being processed for pear halves for canning, that the bridge 321 be left intact so as to avoid unduly weakening the pears at this point for otherwise the pear halves would have a tendency to split into quarters and present an unsightly final product.

Also, to avoid the tendency of a pear to split during the seed-cell coring operation, it is customary to provide machines of this character with opposed pear clamping jaws arranged to close on a pear during seed-cell coring but, since this is an old expedient and is illustrated in the Coons et al. application Serial No. 549,009 above referred to, there appears to be no need of here detailing such structure.

*Processed Pear and Refuse Deflector*

As shown in FIG. 1, our machine is also provided with a deflecting plate 331 extending transversely of the machine and mounted on a shaft 332. Secured to the shaft 332 is a lever 333 and pivoted to the end thereof by a pin 334 is a clamp 335. Secured to the clamp is the forward end of a connecting rod 336, the rear end of this rod being pivoted to a crank 337 by a pin 338. The crank, in turn, is pivoted by a pin 339 to a bracket 341 and well-known means, not shown, is provided for reciprocating the crank 337 so as to position the deflecting plate 331 either under a pear being processed or under a pear being discharged from the machine. In the former case, refuse from the pear is deflected to a refuse container, whereas in the latter case, processed pears are deflected into a processed pear lug box or onto a processed pear conveyor. This structure likewise forms no part of the present invention and, since it is well known in the art, its details of construction and operation require no further description.

It is believed that in view of the general knowledge of the operation of machines of this character, the operation diagram of FIG. 24 should be self-explanatory and consequently requires no further description. It might, however, be noted that although this figure does not include a curve specifically showing the sequence of movement of the pear-sensing assembly, it is indirectly indicated by the "Pear Cup Feed" curve.

We claim:

1. A pear processing machine comprising: a non-rotatable frame; a corer sleeve journaled in said frame for rotation only on its own axis and having forward and rear ends; a hollow spindle journaled in said sleeve for rotation therein, the forward end of said spindle protruding substantially from the forward end of said sleeve; coplanar, diametrically opposed, rearwardly flaring pear keying fins fixed to said spindle immediately forward of the forward end of said sleeve, said fins being formed with rearwardly diverging, arcuate recesses; and an arcuate seed-cell pod coring knife fixed to the forward end of said sleeve, the forward end of said knife being arranged to rotate within the confines of said recesses and including a rearwardly flaring ring circumscribing and fixed to said sleeve intermediate the ends of said coring knife.

2. A pear processing machine comprising: a non-rotatable frame; a corer sleeve journaled in said frame for rotation only on its own axis and having forward and rear ends; a hollow spindle journaled in said sleeve for rotation therein, the forward end of said spindle protruding substantially from the forward end of said sleeve; coplanar, diametrically opposed, rearwardly flaring pear keying fins fixed to said spindle immediately forward of the forward end of said sleeve, said fins being formed with rearwardly diverging, arcuate recesses; and a pair of coplaner diemetrically opposed and longitudinally staggered wire loop seed-cell coring knives fixed to the forward end of said sleeve arranged to make a cut in a pear cirmumscribing the seed-cell pod thereof.

3. A pear processing machine comprising: a non-rotatable frame; a quill journaled in said frame for rotation only on its own axis; a first sleeve journaled within said quill for rotation on said axis, said quill and said first sleeve having adjacent forward and rear ends; a corer sleeve detachably keyed to the forward end of said quill for coaxial rotation therewith; a spindle detachably and coaxially keyed to the forward end of said first sleeve and journaled within said corer sleeve; means for rotating said quill; means for indexing said quill relative to its angular position; means for locking said first sleeve to said quill in the indexed position thereof and for concurrent rotation therewith; and means for locking said first sleeve against rotation and for simultaneously disengaging said first sleeve from said quill so as to permit of the independent rotation of said quill and said corer sleeve.

4. A pear processing machine comprising: a stationary frame; a quill journaled in said frame for rotation only on its own axis; a drive shaft journaled in said frame; means responsive to the rotation of said drive shaft for periodically driving said quill; a first sleeve journaled within said quill; means responsive to the rotation of said shaft for periodically locking said first sleeve to said quill for rotation therewith, for periodically unlocking said first sleeve from said quill and for concurrently locking said first sleeve against rotation; a corer sleeve detachably keyed to the forward end of said quill for coaxial rotation therewith, said corer sleeve extending substantially forward of the forward end of said quill; and a hollow spindle detachably keyed to the forward end of said first sleeve and journaled within said corer sleeve; pear keying fins secured to said spindle forwardly of said corer sleeve; and a seed-cell pod coring knife secured to the forward end of said corer sleeve.

5. A pear processing machine comprising: a non-rotatable frame; a corer sleeve journaled in said frame for rotation only on its own axis and having forward and rear ends; a hollow spindle journaled in said sleeve for rotation therein, the forward end of said spindle protruding substantially from the forward end of said sleeve; coplanar, diametrically opposed, rearwardly flaring pear keying fins fixed to said spindle immediately forward of the forward end of said sleeve, said fins being formed with rearwardly diverging, arcuate recesses; an arcuate seed-cell pod coring knife fixed to the forward end of said sleeve, the forward end of said knife being arranged to rotate within the confines of said recesses; pear feeding means mounted on said frame forwardly of said spindle for periodically impaling a pear on said spindle coaxially therewith; means mounted on said frame adjacent said corer sleeve for sensing a pear and for arresting the rearward movement of said pear feeding means in response to the contact of a pear with said sensing means; means mounted on said frame adjacent the outer confines thereof for adjusting the position of said sensing means fore and aft of said corer sleeve; a peeling head mounted on said frame adjacent said spindle for movement along said spindle; and means mounted on said frame for moving said head along said spindle after said sensing means has sensed a pear.

6. A pear processing machine comprising: a non-rotatable frame; a corer sleeve journaled in said frame for rotation only on its own axis and having forward and rear ends; a hollow spindle journaled in said sleeve for rotation therein, the forward end of said spindle protruding substantially from the forward end of said sleeve; coplanar, diametrically opposed, rearwardly flaring pear keying fins fixed to said spindle immediately forward of the forward end of said sleeve, said fins being formed with rearwardly diverging, arcuate recesses; an arcuate seed-cell pod coring knife fixed to the forward end of said sleeve, the forward end of said knife being arranged to rotate within the confines of said recesses; a knife mount mounted on said frame over the forward end of said corer sleeve for fore and aft movement in parallelism with said corer sleeve and relative thereto; and a forwardly extending knife mounted on said knife mount adjacent said seed-cell pod coring knife.

7. A pear processing machine comprising: a non-rotatable frame; a corer sleeve journaled in said frame for rotation only on its own axis and having forward and rear ends; a hollow spindle journaled in said sleeve for rotation therein, the forward end of said spindle protruding substantially from the forward end of said sleeve; coplanar, diametrically opposed, rearwardly flaring pear keying fins fixed to said spindle immediately forward of the forward end of said sleeve, said fins being formed with rearwardly diverging, arcuate recesses; an arcuate seed-cell pod coring knife fixed to the forward end of said sleeve, the forward end of said knife being arranged to rotate within the confines of said recesses; pear feeding means mounted on said frame forwardly of said spindle for periodically impaling a pear on said spindle coaxially therewith; means mounted on said frame adjacent said corer sleeve for sensing a pear and for arresting the rearward movement of said pear feeding means in response to the contact of a pear with said sensing means; means mounted on said frame adjacent the outer confines thereof for adjusting the position of said sensing means fore and aft of said corer sleeve; a knife mount mounted on said frame over the forward end of said corer sleeve for fore and aft movement in parallelism with said corer sleeve; and a forwardly extending knife mounted on said knife mount adjacent said seed-cell pod coring knife.

8. A pear processing machine comprising: a non-rotatable frame; a corer sleeve journaled in said frame for rotation only on its own axis and having forward and rear ends; a hollow spindle journaled in said sleeve for rotation therein, the forward end of said spindle protruding substantially from the forward end of said sleeve; coplanar, diametrically opposed, rearwardly flaring pear keying fins fixed to said spindle immediately forward of the forward end of said sleeve, said fins being formed with rearwardly diverging, arcuate recesses; an arcuate seed-cell pod coring knife fixed to the forward end of said sleeve, the forward end of said knife being arranged to rotate within the confines of said recesses; pear feeding means mounted on said frame forwardly of said spindle for periodically impaling a pear on said spindle coaxially therewith; means mounted on said frame adjacent said corer sleeve for sensing a pear and for arresting the rearward movement of said pear feeding means in response to the contact of a pear with said sensing means; means mounted on said frame adjacent the outer confines thereof for adjusting the position of said sensing means fore and aft of said corer sleeve; and means mounted on said frame for periodically reciprocating said sensing means fore and aft of said spindle and corer sleeve, thereby to discharge a pear therefrom.

9. A pear processing machine comprising: a stationary frame; a spindle journaled in said frame for rotation only on its own axis, said spindle being fixed against axial translation; a rod mounted in said frame in parallelism with said spindle, said rod being translatable along its own axis; means mounted on said frame for translating said rod; a pear sensing arm pivoted to said rod, adjacent said spindle; means for adjusting the angular position of said pear sensing arm; a knife mounting block mounted on said frame above said spindle for fore and aft movement in parallelism therewith; means mounted on said frame for reciprocating said block; and a forwardly extending knife detachably mounted in said block.

10. A pear processing machine comprising: a stationary frame; a spindle journaled in said frame for rotation only on its own axis, said spindle being fixed against translation along its own axis; a first rod mounted in said frame beneath and in parallelism with said spindle for fore and aft movement along its own axis; a carriage secured to the rear end of said first rod and mounted on said frame for fore and aft movement in parallelism with said spindle; a second rod secured to said carriage and extending rearwardly thereof in parallelism with said first rod; means mounted on said frame for reciprocating said second rod through a lost motion mechanism; a combination pear sensing and discharging arm mounted on the forward end of said first rod adjacent said spindle; a pear feed mechanism mounted on the frame forwardly of and in line with said spindle for periodically impaling a pear on said spindle in contact with said arm; and means responsive to the rearward movement of said arm for arresting the rearward pear impaling movement of said pear feed mechanism.

References Cited in the file of this patent

UNITED STATES PATENTS

| | | |
|---|---|---|
| 1,152,441 | Schlothan et al. | Sept. 7, 1915 |
| 2,056,413 | Thompson et al. | Oct. 6, 1936 |
| 2,102,765 | Thompson et al. | Dec. 21, 1937 |
| 2,664,129 | Coons | Dec. 29, 1953 |
| 2,688,993 | White | Sept. 14, 1954 |
| 2,735,466 | Krstinch | Feb. 21, 1956 |
| 2,820,496 | Keifer | Jan. 21, 1958 |